United States Patent

[11] 3,630,345

| [72] | Inventor | Hans-Robert Schmidt<br>Cologne-Flittard, Germany |
|---|---|---|
| [21] | Appl. No. | 840,298 |
| [22] | Filed | July 9, 1969 |
| [45] | Patented | Dec. 28, 1971 |
| [73] | Assignee | Agfa-Gevaert Aktiengesellschaft<br>Leverkusen, Germany |
| [32] | Priority | July 29, 1968 |
| [33] | | Germany |
| [31] | | A 30183 |

[54] FILM SPOOL WITH A SUPPORT FOR THE ROLL OF FILM
3 Claims, 3 Drawing Figs.

[52] U.S. Cl. .................................................. 206/53,
96/78, 242/71.8
[51] Int. Cl. ........................................ B65d 85/67
[50] Field of Search........................................... 206/59 M,
59 E, 59 F, 59 C, 52, 52 F, 53; 242/71.8, 195;
96/78

[56] References Cited
UNITED STATES PATENTS

| 1,973,457 | 9/1934 | Wittel............................ | 206/59 E |
| 2,400,024 | 5/1946 | Roehrl........................... | 242/71.8 |
| 2,894,620 | 7/1959 | Campbell, Jr. ................ | 206/53 |

FOREIGN PATENTS

| 881,270 | 11/1961 | Great Britain................ | 242/195 |

*Primary Examiner*—William T. Dixson, Jr.
*Attorney*—Connolly and Hutz

ABSTRACT: A film spool having an axial core and a radial flange at each end of the core is provided with camlike projections on the inner radial faces of the flanges. The projections are triangular in shape with an inwardly facing surface parallel to the core and an upper surface tapering from the flange so that a strip wound in a roll on the spool is easily deflected inwardly of the flange and snaps under the projections.

The inwardly directed surfaces of the projections may be adapted to the curvature of the core surface.

PATENTED DEC 28 1971    3,630,345
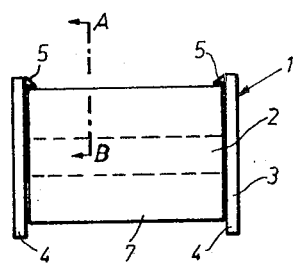
FIG. 1
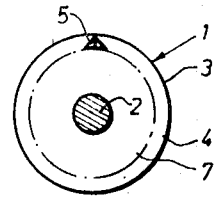
FIG. 2
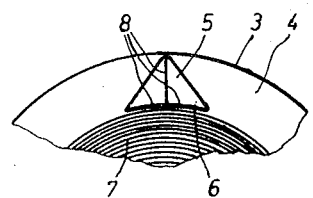
FIG. 3 A-B
INVENTOR.
HANS ROBERT SCHMIDT
BY Connolly and Hutz
his Attorneys

FILM SPOOL WITH A SUPPORT FOR THE ROLL OF FILM

The present invention relates to a film spool which has at least one cam on the outer edge of the inner surfaces of the two flanges of the spool which act as a support for the roll of film.

The function of the cam is to prevent the roll of film from unrolling so that the film cannot be accidentally exposed.

A film spool which has two elliptical cams on each flange, forming elevations on the inner surface of each flange to hold the roll of film in place is already known.

It has been found that owing to the relatively small curvature of these cams, the film itself or the backing paper is likely to buckle up.

According to the present innovation, these disadvantages are overcome by making the cam in the form of a triangular projection which has an inwardly facing surface which extends parallel to the external peripheral surface of the roll of film and which tapers from the flange of the spool. As a result of this arrangement, the film strip or backing paper is easily deflected from the upper outwardly directed edge of the triangular projection towards the core of the spool when the film is being rolled up, and thus snaps into the underside of the projection. The size of the triangular projection is adapted to the dimensions of the spool. For a normal spool for roll films, for example, the height of the projection, measured from the inner surface of the flange, would be of the order of about 0.2 to 1 mm. The base of the triangle may vary from about 0.3 to 1.5 mm.

According to particular embodiment of the triangular projection, the inwardly directed surface of the projection is advantageously adapted to the curvature of the roll of film. This provides for a firmer fit of the film roll.

It has been found that there is no risk of damage to the film or to the backing paper if according to another embodiment of the invention the edges of the triangular projection are interrupted or rounded off.

Owing to the small dimensions of the triangular projection and a certain elasticity of the flanges of the spool, no difficulties are expected in winding the film on to, or off, the spool.

A constructional example of the film spool according to the invention is shown purely diagrammatically in a drawing in which:

FIG. 1 is a front view of the film spool;
FIG. 2 is a section through the film spool and roll of film; and
FIG. 3 is a section through the triangular projection along the line A-B of FIG. 1 on an enlarged scale.

The film spool 1 consists substantially of a core 2 and flanges 3 and is produced by injection moulding in the usual manner. Triangular projections 5 are sprayed on to the inner surface 4 of the spool flanges 3. The triangular projections are arranged so that their inwardly facing surfaces 6 are adapted to the curvature of the roll of film 7. The edges 8 are slightly rounded to prevent damage to the film or backing paper. It should be understood that the tip of the projection is also broken.

I claim:
1. A film spool which has at least one cam on the outer peripheral edge of the inner radial surface of the two flanges, said cam serving as support for a film roll, characterized in that the cam is tetrahedral in form, the inwardly directed undersurface of the cam being parallel to the external generatrix of the film roll and curving circumferentially of the roll and said cam tapering axially from the flange of the spool.

2. A film spool as claimed in claim 1, characterized in that the edges of the triangular projection are broken.

3. In a roll film assembly having a film spool and a resilient backing material, the combination of a film spool having an axial core and a pair of radial flanges, a roll of resilient film-backing material disposed on the spool between the flanges, at least one tetrahedral camlike projection on the inner radial surface of one of said flanges immediately adjacent the outer periphery of the radial surface, the radially innermost face of said projection being axially parallel to and circumferentialLy curved to substantially conform to the outer periphery of said film roll, two radially outer surfaces of the projection tapered in dimension to provide the tetrahedral form, the plan of the projection at the radial flange forming the fourth surface of the tetrahedral projection whereby the resilient backing material is fittable firmly on the spool and resiliently fitted into place under the innermost face of the projection.

* * * * *